United States Patent [19]

Shimozawa et al.

[11] Patent Number: 5,050,154
[45] Date of Patent: Sep. 17, 1991

[54] OPTICAL RECORDING/REPRODUCING MODULE HAVING REDUCED SIZE

[75] Inventors: Kenji Shimozawa, Musashino; Tsutomu Morita, Mitaka, both of Japan

[73] Assignee: TEAC Corporation, Japan

[21] Appl. No.: 277,337

[22] Filed: Nov. 29, 1988

[30] Foreign Application Priority Data

Dec. 1, 1987 [JP] Japan .................. 63-183221[U]

[51] Int. Cl.$^5$ ............................................. G11B 7/135
[52] U.S. Cl. ................. 369/112; 369/44.140; 369/120; 369/121
[58] Field of Search ............. 350/242, 245, 247, 255; 250/239, 216, 201.5; 369/44.11, 44.14, 112, 120, 121; 174/16.3

[56] References Cited

U.S. PATENT DOCUMENTS

| | | | |
|---|---|---|---|
| 4,564,757 | 1/1986 | LaBudde et al. | 250/239 |
| 4,719,614 | 1/1988 | Leterme et al. | 369/112 X |
| 4,730,899 | 3/1988 | Kime et al. | 369/44.14 X |
| 4,791,290 | 12/1988 | Noone et al. | 250/239 |
| 4,792,674 | 12/1988 | Hirano | 250/239 X |
| 4,879,630 | 11/1989 | Boucard et al. | 174/16.3 X |
| 4,890,194 | 12/1989 | Derryberry et al. | 174/16.3 X |
| 4,906,839 | 3/1990 | Lee | 250/239 |
| 4,956,833 | 9/1990 | Kokado et al. | 369/112 X |

*Primary Examiner*—Robert L. Richardson
*Assistant Examiner*—W. R. Young
*Attorney, Agent, or Firm*—Andrus, Sceales, Starke & Sawall

[57] ABSTRACT

An optical recording/reproducing module comprises a housing defined with a depression, a focusing actuator provided on one side of the housing for carrying an objective lens such that the lens is movable in a direction perpendicular to the aforementioned one side, an optical system accommodated in the depression, the optical system includes an optical source for producing a first optical beam to be directed to the objective lens, an optical detector for detecting a second optical beam received by the objective lens and incident to the optical detector, the optical detector further produces an electrical output signal responsive to the second optical beam, and an array of optical elements for guiding the first optical beam produced by the optical source to the objective lens and for guiding the second optical beam received by the objective lens to the optical detector, a cover lid adapted to be mounted on the one side of the housing, the cover lid has a shape adapted to close the depression, and an electrical system provided on the cover lid for driving the optical source and for amplifying the electrical output signal from said optical detector.

8 Claims, 4 Drawing Sheets

OPTICAL RECORDING/REPRODUCING MODULE HAVING REDUCED SIZE

BACKGROUND OF THE INVENTION

The present invention generally relates to optical disk recording/reproducing apparatus for recording and/or reproducing information signal on and from an optical disk by means of an optical beam, and in particular to an optical recording/reproducing module used in such an optical disk recording/reproducing apparatus for producing and focusing the optical beam on the optical disk, in which an optical system for producing, guiding and focusing the optical beam on the optical disk and an electrical system for modulating and/or demodulating the information signal on and from the optical beam are accommodated in a common housing.

An optical disk recording/reproducing apparatus records and/or reproduces an information signal on and from a rotary optical disk by means of an optical beam. For this purpose, the optical disk recording/reproducing apparatus uses an optical recording/reproducing system comprising an optical system for producing, guiding and focusing the optical beam on the optical disk, and an electrical system for modulating and/or demodulating information signal on and from the optical beam.

Conventionally, such an optical recording/reproducing system has a linearly aligned configuration of a laser diode for producing the optical beam, a collimator lens for shaping the optical beam to form a parallel optical beam and an objective lens for focusing the parallel optical beam on a recording surface of the optical disk. Such an optical recording/reproducing system is disposed perpendicularly to the plane of the optical disk. Further, the conventional optical recording/reproducing system comprises a beam splitter provided in the aforementioned linearly configured optical path so as to divert an optical beam reflected back from the optical disk perpendicularly to the first mentioned linear optical path to a photo detector included in the optical system after passing through an array of a plano-convex lens and a cylindrical lens. Typically, the electrical system comprises a drive circuit for driving the laser diode and a processing circuit for processing the electrical signal produced by the photo detector, and the electrical system is disposed further below the optical system. Such an optical recording/reproducing system has a problem of large size and is contradictory to the requirement of size reduction of the optical disk recording/reproducing apparatus.

Further, there is a known optical recording/reproducing module having an optical path extending parallel to the optical disk. This optical path connects various optical elements such as a laser diode, photo detector, collimator lens, plano-convex lens, cylindrical lens, beam splitter and the like and extends parallel to the optical disk. Further, the optical path is deflected by a mirror in a direction perpendicular to the plane of the optical disk and the optical beam thus deflected is focused on the optical disk through an objective lens. In such a recording/reproducing module, the optical system is accommodated in a generally rectangular-shaped flat box or housing. The housing has an opening on its top side for allowing entrance of various optical elements at the time of assembly and this opening is closed by a cover lid. Further, a focusing actuator carrying the objective lens projects upwards from the top side of the housing. The housing is usually disposed below the optical disk such that the flat housing extends parallel to the disk. On the other hand, the electrical system for driving the laser diode and for processing the output electrical signal of the photo diode is provided on a circuit board which is provided remote from the housing accommodating the optical system.

In such a conventional optical recording/reproducing module, there is a problem that a space surrounding the focusing actuator which is extending upwards from the top side of the housing and also a space formed above the optical system in the housing are not used at all. In order to achieve size reduction of the optical disk recording/reproducing apparatus, such an unused space should be eliminated. Further, in such an optical recording/reproducing module, there is another problem that a relatively long wire has to be used for connecting the laser diode or photo detector in the optical system to a cooperating circuitry in the electrical system, since the electrical system is provided at a location which is relatively distant from the location where the optical system is provided. The use of such a long connection wire is undesirable as the chance that the faint electrical signal produced by the photo detector picks up electromagnetic interference when the signal is transmitted through the wiring is increased. In order to avoid such an interference, the conventional optical recording/reproducing module uses a specially designed wire such as a coaxial cable and a corresponding connector. However, such a coaxial cable and corresponding connector are heavy and the use of them invites increase in weight of the recording/reproducing apparatus. Further, as a consequence of the use of connectors, the conventional optical recording/reproducing module tends to suffer from electrostatic breakdown of semiconductor devices which occasionally occurs when the cable is connected.

Further, when using the aforementioned construction having an optical path extending parallel to the optical disk for recording the information signal on the optical disk, there arises another problem of cooling the electrical system, as a high output power laser beam has to be produced at the time of recording. The aforementioned construction is particularly disadvantageous as the opening at the top of the housing is closed by a cover lid for preventing the invasion of dust into the housing, and the heat released from the semiconductor chips tends to be accumulated in the housing. Such an accumulation of heat in the housing invites an undesirable temperature rise in the optical system in the housing.

SUMMARY OF THE INVENTION

Accordingly, it is a general object of the present invention to provide a novel and useful optical recording/reproducing module of an optical disk recording/reproducing apparatus wherein the aforementioned problems are eliminated.

Another and more specific object of the present invention is to provide an optical recording/reproducing module which is compact and light in weight.

Another object of the present invention is to provide an optical recording/reproducing module wherein an optical system including a laser diode and a photo detector and an electrical system including a drive circuit for driving the laser diode and a processing circuit for processing an electrical output of the photo detector are disposed such that the distance between the optical system and the electrical system is minimized.

Another object of the present invention is to provide an optical recording/reproducing module comprising an optical system including a laser diode and a photo detector accommodated in a space defined in a generally rectangular housing, said housing having a top side from which a focusing actuator carrying an objective lens is projected upwards, and an electrical system provided on a wiring board carrying a conductor pattern connecting various electronical elements on the board, wherein said wiring board acts also as a cover lid for closing a top opening of the space in the housing. According to the present invention, the space in the optical disk recording/reproducing apparatus is efficiently utilized by disposing electrical elements of the electrical system in a space in the housing which is not occupied by the optical system and the size of the optical disk recording/reproducing apparatus can be reduced. Further, the distance between the optical system accommodated in the housing and a printed circuit board carrying the electrical system is minimized and the optical recording/reproducing module becomes substantially less vulnerable to external noise. In other words, the optical recording/reproducing module of the present invention provides an improved signal-to-noise ratio. Furthermore, as a consequence of the improvement in the signal-to-noise ratio, the module of the present invention can use a light weight flexible printed circuit as a connecting cable for connecting the laser diode and the photo detector to respective cooperating circuits instead of using heavy coaxial cable and connector. As a result, the weight of the optical recording/reproducing apparatus is decreased. Further in accordance with the present invention, the static breakdown of semiconductor chips at the time of assembly is effectively prevented by eliminating the use of the connectors. Furthermore, optical system in the housing is protected from dust by the printed circuit board which acts also as the cover lid of the housing.

Another object of the present invention is to provide an optical recording/reproducing module comprising an optical system including a laser diode and a photo detector accommodated in a space defined in a generally rectangular housing, said housing having a top side from which a focusing actuator carrying an objective lens is projected upwards, and an electrical system provided on a wiring board carrying a pattern of conductor connecting various electronic elements provided on the board, said board acting also as a cover lid closing a top opening of the space in the housing, wherein a cooling structure is provided on an outer side of the wiring board which in turn carries the electronic elements on its inner side. According to the present invention, the heat produced by the electronic elements when the optical recording/reproducing module is operated in a recording mode and a high power output optical beam is produced, is effectively dissipated and the temperature rise in the housing due to the heating of the electronic elements is successfully suppressed. Consequently, the deformation or change in size of the optical elements of the optical system is virtually eliminated. Further, as a consequence of the effective heat dissipation, the optical recording/reproducing module can operate without problem even if the optical system is completely confined in the housing by closing the space by the wiring board acting as the cover lid. As a result, the optical recording/reproducing module of the present invention is virtually free from invasion of dust into the optical system.

Still other objects and further features of the present invention will become apparent from the following detailed description when read in conjunction with attached drawings.

DETAILED DESCRIPTION

Figure 1A:
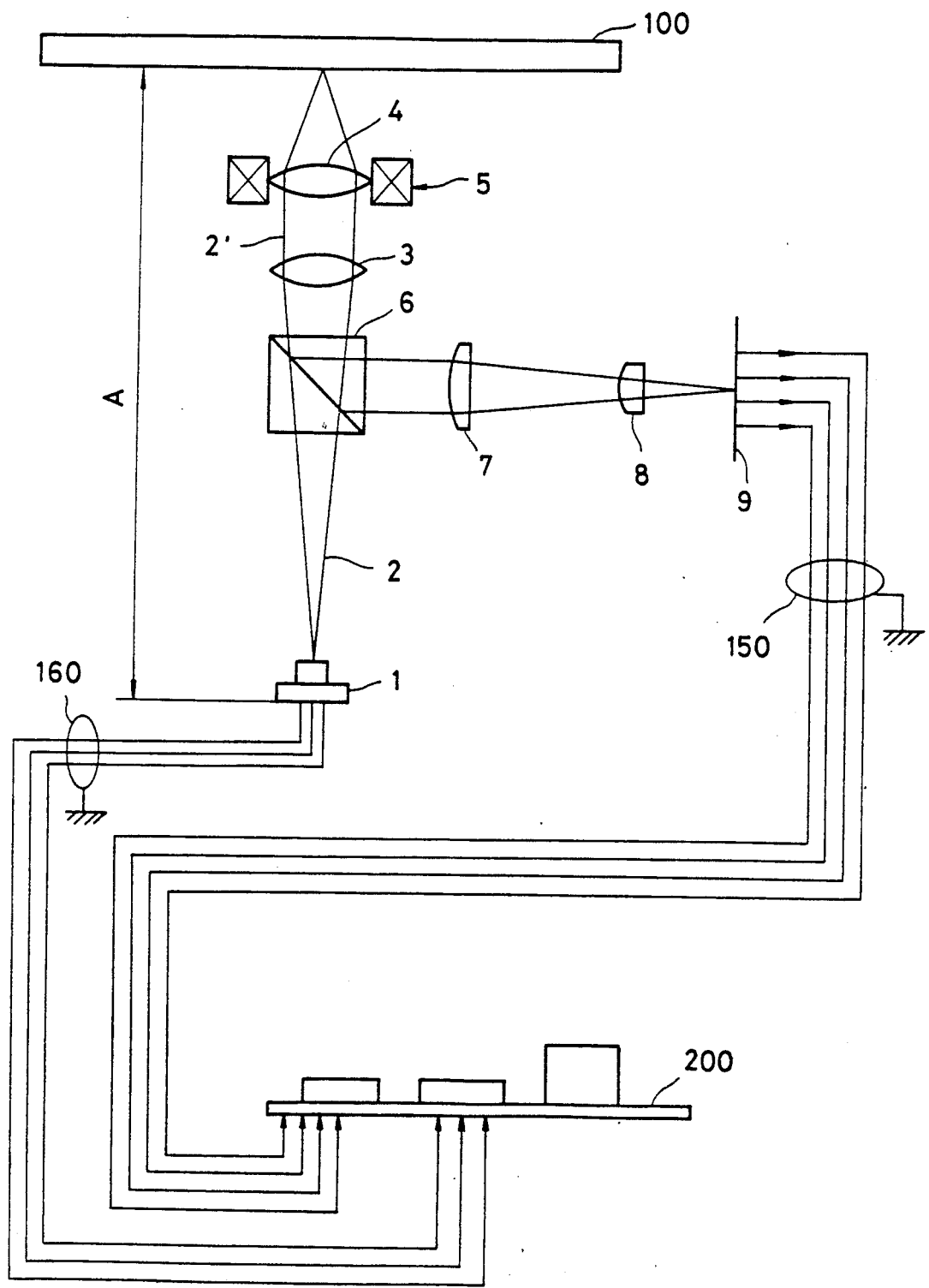
FIGS. 1(A) and (B) are diagrams showing a conventional optical recording/reproducing system used in a typical optical disk recording/reproducing apparatus.

FIG. 1(A) shows a prior art optical recording/reproducing system used in a typical optical recording/reproducing apparatus. Referring to the drawing, the optical recording/reproducing system comprises an optical system including a laser diode 1 for producing an optical beam 2, a collimator lens 3 for producing a parallel optical beam 2' from the optical beam 2 produced by the laser diode, an objective lens 4 carried by a focusing actuator 5 in a manner movable upwards and downwards for focusing the optical beam on an optical disk 100, a beam splitter 6 disposed in an optical path extending from the laser diode 1 to the collimator lens 3 for diverting an optical beam which is reflected by the optical disk 100 and returning to the laser diode 2, a plano-convex lens 7 and a cylindrical lens 8 for focusing the optical beam thus diverted by the beam splitter 6 on a quadrant imaging surface of a photo detector array 9 for detecting the state of focusing of the optical beam on the optical disk. As such an optical recording/reproducing system uses an array of linearly aligned optical elements, the size A of the system inevitably becomes large and the size of the optical disk recording/reproducing apparatus using such an recording/reproducing system inevitably becomes large. Further, such a conventional optical recording/reproducing system comprises an electrical system 200 for cooperation with the laser diode 1 and the photo detector array 9, and is located at a position remote from the photo detector in the optical system. As the distance between the photo detector array 9 and the electrical system 200 is relatively long, one has to use a specially designed cable such as a coaxial cable 150 and a corresponding connector (not shown) for connection of the photo detector array 9 to the electrical system 200 so as to avoid electromagnetic interference. Similarly, the laser diode 1 and the electrical system 200 is connected by a coaxial cable 160. However, such a coaxial cable and corresponding connector are heavy and the use of such a connection means increases the weight of the optical disk recording/reproducing apparatus.

Figure 1B:
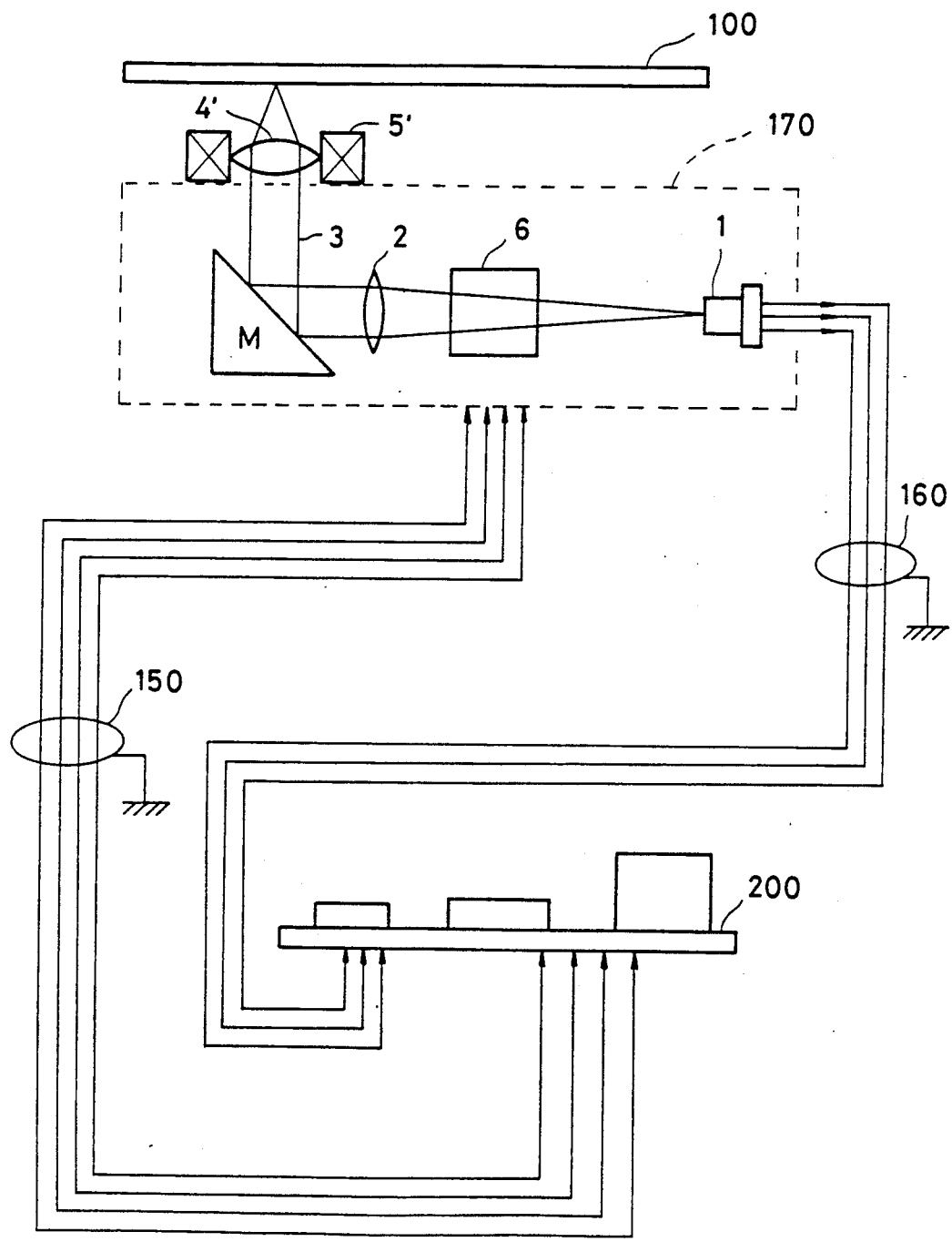

FIG. 1(B) shows another prior art optical recording/reproducing system in which the optical system is disposed horizontally below the optical disk 100 and the optical beam 3 is deflected upwards by a mirror M and is focused on the optical disk via an objective lens 4' held by an focusing actuator 5' provided on a top side of a housing 170 shown by a broken line. In this view, the optical beam is diverted by the beam splitter 6 in a vertical direction to the plane of the paper and is detected by the photo detector array 9 (not shown) after passing through the plano-convex and cylindrical lenses 7 and 8 (not shown). In this system, too, the electrical system 200 is provided at a location remote from the optical system and a similar problem to the case of FIG. 1(A) arises. Further, there arises a problem of space utilization in this system as the space in the housing 170 not fully occupied by the optical elements and the space formed around the focusing actuator 5' projecting upwards from the top side of the housing 170 is not used at all.

Figure 2:
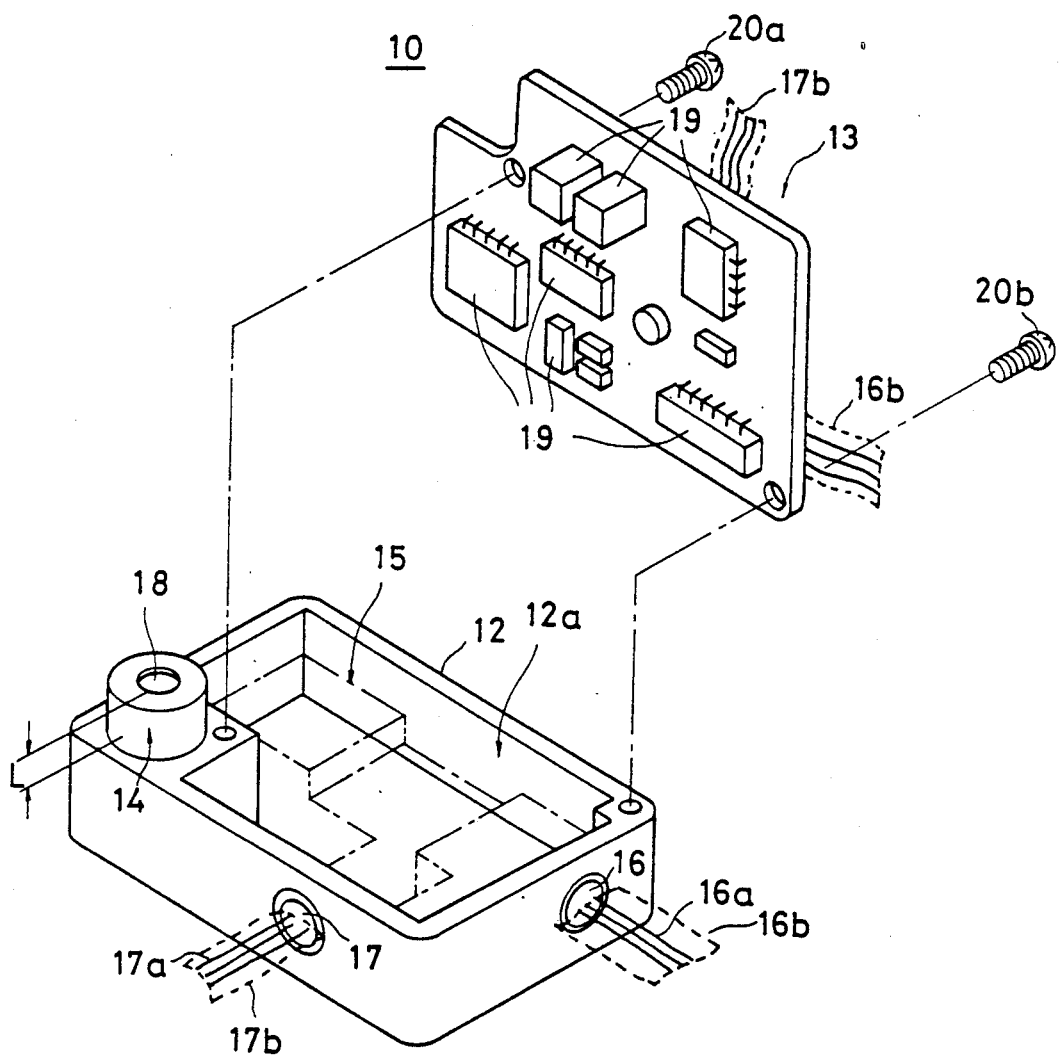
FIG. 2 is a perspective view showing a first embodiment of the optical recording/reproducing module of the present invention in an exploded state.
Figure 3:
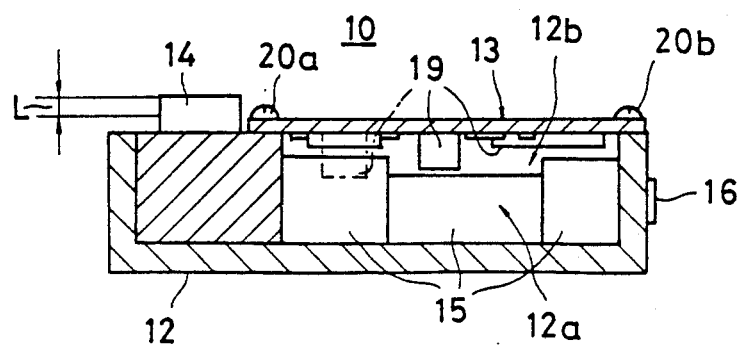
FIG. 3 is a cross sectional view showing the optical recording/reproducing module of FIG. 2 in an assembled state.

Next, a first embodiment of the present invention will be described with reference to FIGS. 2 and 3. Referring to FIG. 2, an optical recording/reproducing module 10 constituting the first embodiment of the present invention comprises a housing 12 defined with an inner space 12a for accommodating an optical system for producing, guiding and focusing an optical beam on an optical disk (not shown in FIG. 2) and a cover lid 13 for closing the space 12a of the housing 12. The module 10 is incorporated into an optical recording/reproducing apparatus and performs the recording and/or reproducing of information signal on and from the optical disk by the optical beam. The housing 12 has a generally boxy shape with an opening on its top side continuing to the inner space 12a. On this top side, a focusing actuator 14 carrying an objective lens 18 for focusing the optical beam on the optical disk is provided such that the objective lens 18 is movable upwards and downwards. Thus, the focusing actuator 14 projects upwards from the top side of the housing 12. The structure of the focusing actuator 14 is well known and the description thereof will be omitted. As described previously, the housing 12 is defined with an inner space 12a in continuation with the top opening, and an optical system 15 (represented generally by a one-dotted chain in the drawing) similar to the one shown in FIG. 1(B) including a laser diode 16 for producing the optical beam and a photo diode 17 for detecting the optical beam are accommodated into this space 12a. Such a structure of the housing 12 is well known in the art. It should be noted that the actuator 14 is driven so as to move the objective lens 18 upwards and downwards, and as a result, a proper focusing and tracking is maintained. The optical system 15 may include a beam splitter, cylindrical lens, collimator lens, quarter wave plate and the like not specifically illustrated in the drawing, and guides the optical beam produced by the laser diode 16 to the objective lens 18 where it is focused on the surface of the optical disk. Further, the optical beam reflected by the optical disk and carrying information recorded on the optical disk therewith is guided by the optical system 15 to the photo diode 17. Each element of this optical system 15 has various sizes and shapes and is mounted on the bottom of the space 12a in the housing 12. Thus, there is formed a space which is not used for propagation of light beam at a relatively upper portion of the space 12a. This portion of the space is designated by a reference numeral 12b in FIG. 3.

The cover lid 13 comprises a wiring board such as a printed circuit board carrying a conductor pattern for wiring thereon, and has a shape adapted to close the top opening of the housing 12 when it is placed on the housing 12. The lid 13 carries on its inner side facing the space 12a of the housing 12 various elements of an electrical system 19 and the aforementioned conductor pattern is carried on its outer side. The electrical system 19 provided on the cover lid 13 comprises a drive circuit for driving the laser diode 16 and an amplifier cooperating with the photo diode 17. Conventionally, such an electrical system is provided on a separate wiring board which is located remote from the housing 12. In the present embodiment, the use of separate wiring board at a remote location is eliminated by using the cover lid 13 also for the wiring board carrying the conductor pattern. As a result, the use of separate wiring board is eliminated and the number of parts is reduced.

The cover lid 13 is fixed on the housing 12 by screws 20a and 20b. It should be noted that the electrical system is designed such that each of the electronic elements of the electrical system is accommodated into the space 12a in the housing 12. The electronic elements of the electrical system are disposed on the cover lid or wiring board 13 such that the elements do not interrupt the transmission of the optical beam between various optical elements of the optical system. Thus, the upper space portion 12b of the space 12 which is hitherto not used for any purpose is now used for accommodating the electronic element of the electrical system and the efficiency in the space utilization in the housing is significantly improved.

The cover lid 13 is configured to have a generally identical shape to the conventional cover lid closing the space 12a and tightly closes the space 12a from its top. Thus, invasion of dust into the housing 12 is effectively prevented by the cover lid 13. In the present embodiment, the cover lid 13 not only closes the opening 12a but also acts as the wiring board carrying the conductor pattern used for wiring of the various electronic elements.

After mounting the cover lid 13 on the housing 12, lead wires 16a of the laser diode 16 in the housing 12 and lead wires 17a of the photo diode 17 in the housing 12 are connected directly or via a flexible printed circuits 16b and 17b to the corresponding terminals at the outer side of the cover lid 13 (not shown). As a result, undesirable circuitous path of the electrical connection is eliminated and the chance that the electric noise is picked up is reduced. Further, such a reduction in the length of the connecting wire leads to a reduction in the stray capacitance and the frequency characteristics of transmission path formed by the wire is improved. As a result of such a noise immune construction, one can eliminate the use of heavy coaxial cable and connector hitherto used for connecting the optical system and the electrical system in the conventional optical recording/reproducing system of the optical disk recording/reproducing apparatus. Further, as a result of elimination of the use of a connector, the electrostatic breakdown of the semiconductors which occurs occasionally when the connector is connected for assembling the system is eliminated. Furthermore, one can reduce the number of parts used in the optical disk recording/reproducing apparatus.

Next, a second embodiment of the optical recording/reproducing module of the present invention will be described with reference to FIG. 4. In the drawing, those parts constructed identically to those corresponding parts in FIG. 2 are given identical reference numerals and the description thereof will be omitted.

Figure 4:
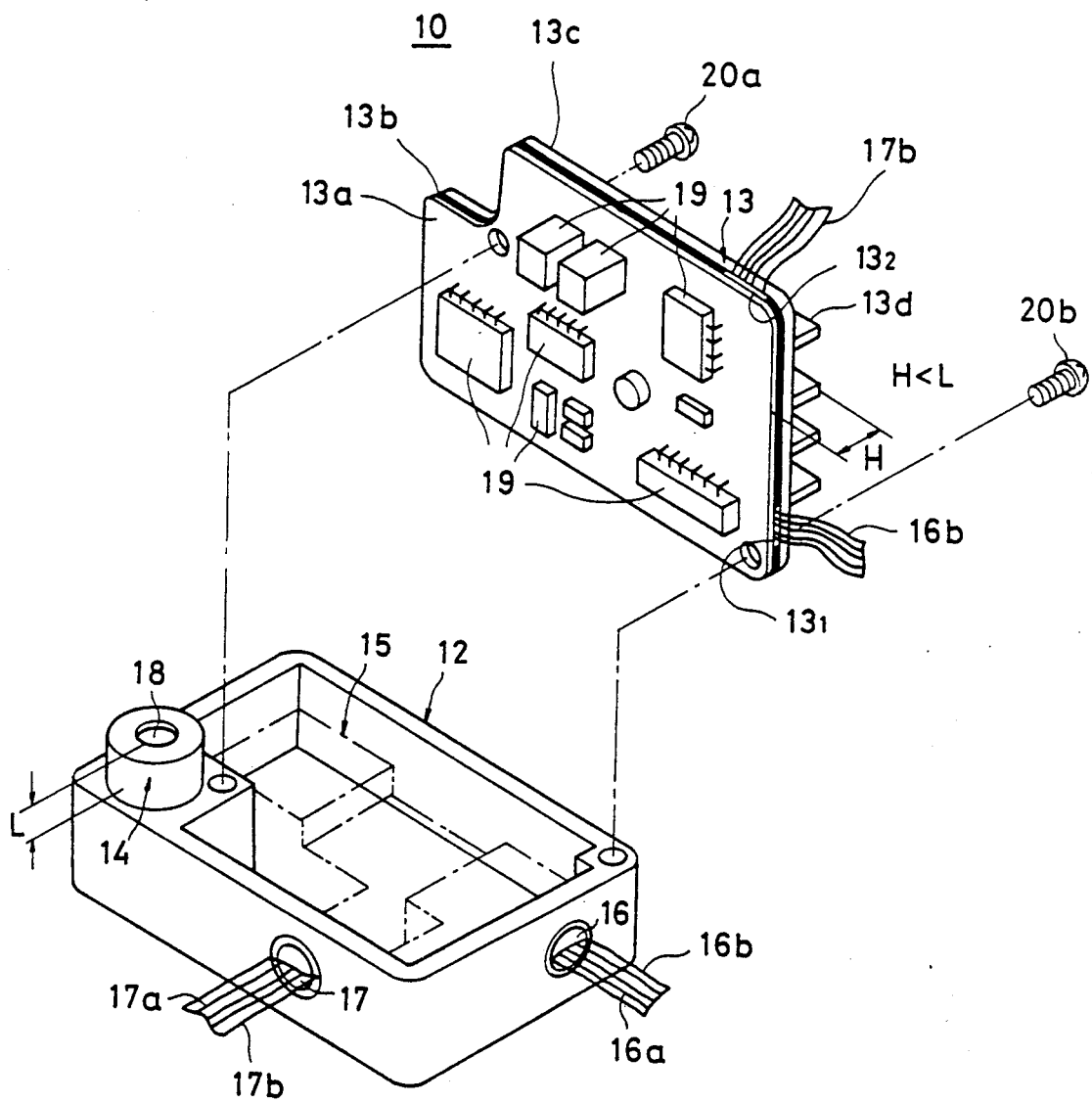
FIG. 4 is a perspective view similar to FIG. 2 showing a second embodiment of the optical recording/reproducing apparatus of the present invention.

Referring to FIG. 4, the cover lid 13 comprises a printed circuit board 13a, an insulating layer 13b and a heat dissipation layer 13c carrying a heat dissipating structure such as a cooling fin 13d thereon. In this embodiment, the heat produced by the semiconductor elements in the housing 12 is conducted to the heat dissipating layer 13c through the insulating layer 13b where the heat is effectively dissipated to the air from the heat dissipating structure 13d. For this purpose, the cover lid 13 may be made of a heat conductive insulator such as an alumina ceramic, and the insulating layer 13b is made of a heat conductive resin such as an epoxy resin which is applied on the printed circuit board after the wiring of the electrical system is completed. The heat dissipating layer 13c may be made of a metal such as aluminium and the heat dissipating structure such as the cooling fin 13d may be cast as an integral body with the heat dissipating layer 13c. As the focusing actuator 14 on the top of the housing 12 has a minimum projection L as illustrated, the height H of the heat dissipating structure 13d measured from the bottom of the printed circuit board 13a must be smaller than the projection L in order to avoid contact with the optical disk located above the housing 12. Further, the isolating layer 13b may have cutouts $13_1$ and $13_2$ so as to accommodate the wiring such as the flexible printed circuits 16b, 17b connecting the electronic system 19 on the printed circuit board 13a to the laser diode 16 and the photo diode 17. By providing the cutouts $13_1$ and $13_2$, the isolating layer 13b is defined by surfaces extending parallel to the printed circuit board 13a as well as to the heat dissipating layer 13c and an intimate contact is established between the printed circuit board 13a and the isolating layer 13b and also between the isolating layer 13b and the heat dissipating layer 13c. According to this embodiment, the temperature rise in the housing 12 is effectively suppressed and the operation of the optical recording/reproducing apparatus is stabilized.

Further, various variations and modifications may be made without departing from the scope of the present invention.

What is claimed is:

1. An optical recording/reproducing module for recording/reproducing information to/from a recording medium, said module comprising:
   a housing having a depression therein;
   a focusing actuator provided on one side of said housing for carrying an objective lens such that the lens is movable in a direction perpendicular to said one side;
   an optical system accommodated in said depression, said optical system including an optical source means for producing a first optical beam to be directed to said objective lens and the recording medium, an optical detector means supplied with a second optical beam received by said objective lens from the recording medium for producing an electrical output signal responsive to said second optical beam, and an array of optical elements for guiding the first optical beam produced by the optical source means to said objective lens and for guiding the second optical beam received by said objective lens to the optical detector means;
   a cover lid adapted to be mounted on said one side of the housing, said cover lid having a shape adapted to close said depression; and
   an electrical system provided on said cover lid for driving said optical source means and for amplifying said electrical output signal from said optical detector means.

2. An optical recording/reproducing module as claimed in claim 1 in which said electrical system is provided on a first side of said cover lid which faces said depression.

3. An optical recording/reproducing module as claimed in claim 1 in which said optical source means and said optical detector means are connected directly to said electrical system.

4. An optical recording/reproducing module as claimed in claim 1 in which said optical source means and said optical detector means are connected to said electrical system by a flexible printed circuit.

5. An optical recording/reproducing module as claimed in claim 2 in which said depression is provided on said one side of the housing, and said cover lid carries a heat dissipating layer including a heat dissipating structure on a second side opposite to said first side of the cover lid.

6. An optical recording/reproducing module as claimed in claim 5 in which said heat dissipating structure is a cooling fin means.

7. An optical recording/reproducing module as claimed in claim 5 in which said heat dissipating layer is carried by the cover lid via an electrical insulator layer.

8. An optical recording/reproducing module as claimed in claim 7 in which the optical source means and the optical detector means are connected to the electrical system via a flexible printed circuit, and said electrical insulator layer is formed with a cutout part for allowing insertion of the flexible printed circuit in a space between the cover lid and the heat dissipating layer defined by the cutout part.

* * * * *